United States Patent
Lefevre et al.

(10) Patent No.: US 7,985,121 B2
(45) Date of Patent: Jul. 26, 2011

(54) CHEMICAL-MECHANICAL PLANARIZATION PAD HAVING END POINT DETECTION WINDOW

(75) Inventors: Paul Lefevre, Topsfield, MA (US); Oscar K. Hsu, Chelmsford, MA (US); David Adam Wells, Hudson, NH (US); John Erik Aldeborgh, Boxford, MA (US); Marc C. Jin, Boston, MA (US)

(73) Assignee: Innopad, Inc., Peabody, MA (US)

( * ) Notice: Subject to any disclaimer, the term of this patent is extended or adjusted under 35 U.S.C. 154(b) by 342 days.

(21) Appl. No.: 12/179,359

(22) Filed: Jul. 24, 2008

(65) Prior Publication Data

US 2009/0142989 A1 Jun. 4, 2009

Related U.S. Application Data

(60) Provisional application No. 60/991,513, filed on Nov. 30, 2007.

(51) Int. Cl.
*B24B 49/12* (2006.01)
(52) U.S. Cl. .............................. 451/6; 451/41
(58) Field of Classification Search ............ 451/41, 451/42, 287, 288, 526, 527, 530, 532, 536, 451/6; 51/293, 297, 298
See application file for complete search history.

(56) References Cited

U.S. PATENT DOCUMENTS

| | | |
|---|---|---|
| 5,605,760 A | 2/1997 | Roberts |
| 5,893,796 A | 4/1999 | Birang et al. |
| 5,984,769 A | 11/1999 | Bennett et al. |
| 6,045,439 A | 4/2000 | Birang et al. |
| 6,068,539 A | 5/2000 | Bajaj et al. |
| 6,254,459 B1 | 7/2001 | Bajaj et al. |
| 6,280,290 B1 | 8/2001 | Birang et al. |
| 6,517,417 B2 | 2/2003 | Budinger et al. |
| 6,604,985 B2 | 8/2003 | Muilenburg et al. |
| 6,621,584 B2 * | 9/2003 | Pecen et al. ................... 356/630 |
| 6,676,483 B1 | 1/2004 | Roberts |
| 6,752,690 B1 | 6/2004 | Fruitman |
| 6,786,810 B2 | 9/2004 | Muilenburg et al. |
| 6,832,947 B2 | 12/2004 | Manning |
| 6,832,949 B2 | 12/2004 | Konno et al. |
| 6,832,950 B2 | 12/2004 | Wright et al. |
| 6,860,793 B2 | 3/2005 | Budinger et al. |

(Continued)

FOREIGN PATENT DOCUMENTS

EP 941806 1/2003

OTHER PUBLICATIONS

International Search Report dated Oct. 22, 2008 issued in related International Patent Application No. PCT/US0871074.

*Primary Examiner* — Robert Rose
(74) *Attorney, Agent, or Firm* — Grossman, Tucker, Perreault & Pfleger, PLLC

(57) ABSTRACT

A chemical mechanical polishing pad. The pad includes a surface and a polymer matrix capable of transmitting at least a portion of incident radiation. In addition, at least one embedded structure in the polymer matrix, including a portion of the pad where the embedded structure is not present, and a window integral to the pad defined by the portion of the pad where the embedded structure is not present.

17 Claims, 5 Drawing Sheets

U.S. PATENT DOCUMENTS

| | | |
|---|---|---|
| 6,910,944 B2 | 6/2005 | Birang et al. |
| 6,960,120 B2 | 11/2005 | Prasad |
| 6,984,163 B2 | 1/2006 | Roberts |
| 7,011,565 B2 | 3/2006 | Birang et al. |
| 7,118,450 B2 | 10/2006 | Birang et al. |
| 7,195,539 B2 | 3/2007 | Turner et al. |
| 7,273,407 B2 | 9/2007 | Saikin |
| 2002/0127951 A1 | 9/2002 | Ishikawa et al. |
| 2004/0082276 A1 | 4/2004 | Prasad |
| 2004/0102141 A1 | 5/2004 | Swisher et al. |
| 2004/0209066 A1 | 10/2004 | Swisher et al. |
| 2004/0224611 A1 | 11/2004 | Aoi et al. |
| 2006/0166608 A1* | 7/2006 | Chalmers et al. .................. 451/6 |
| 2006/0276109 A1* | 12/2006 | Roy et al. ........................ 451/41 |

* cited by examiner

CHEMICAL-MECHANICAL PLANARIZATION PAD HAVING END POINT DETECTION WINDOW

CROSS REFERENCE TO RELATED APPLICATIONS

The present application claims the benefit of the filing date of U.S. Provisional Application Ser. No. 60/991,513, filed Nov. 30, 2007, the teachings of which are incorporated herein by reference.

FIELD OF THE INVENTION

The present invention relates to a polishing pad including an end point detection window that may be useful in chemical-mechanical planarization (CMP) of semiconductor wafers. The pads may include grooves as well as a grid network embedded in a continuous polymer matrix.

BACKGROUND

Semiconductor devices are formed from a flat, thin wafer of a semiconductor material, such as silicon. As the devices and layers of interconnecting circuits are deposited on the wafer, each layer must be polished to achieve a sufficiently flat surface with minimal defects before the next layer can be deposited. A variety of chemical, electrochemical, and chemical mechanical polishing techniques are employed to polish the wafers.

In chemical mechanical polishing (CMP), a polishing pad made of polymer material, such as a polyurethane, may be used in conjunction with a slurry to polish the wafers. The slurry comprises abrasive particles, such as aluminum oxide, cerium oxide, or silica particles, dispersed in an aqueous medium. The abrasive particles generally range in size from 20 to 200 nanometers (nm). Other agents, such as surface acting agents, oxidizing agents, or pH regulators, are typically present in the slurry. The pad may also be textured, such as with grooves or perforations, to aid in the distribution of the slurry across the pad and wafer and removal of the slurry and by products therefrom.

For example, in U.S. Pat. No. 6,656,018, whose teachings are incorporated herein by reference, a pad for polishing a substrate in the presence of a slurry is disclosed, where the slurry may contain abrasive particles and a dispersive agent. The pad itself may include a work surface and a backing surface. The pad may be formed from a two-component system, a first component comprising a soluble component, a second component comprising a polymer matrix component, where the soluble component is distributed throughout at least an upper portion of the working structure and the soluble component may include fibrous materials soluble in the slurry to form a void structure in the work surface.

It is useful to end the CMP process when the desired amount of material has been removed from the surface of the substrate. In some systems, the CMP process is continually monitored throughout in order to determine when the desired amount of material has been removed from the surface of the substrate, without stopping the process. This is typically done by in-situ optical end-point detection. In-situ optical end-point detection involves projecting optical (or some other) light through an aperture or a window in the polishing pad from the platen side so that the optical light is reflected off the polished surface of the substrate and is collected by a detector to monitor the progress of planarization of the wafer surface.

SUMMARY

In a first aspect, the present disclosure relates to a chemical mechanical polishing pad. The pad may include a surface and a polymer matrix capable of transmitting at least a portion of incident radiation. In addition, the pad may include at least one embedded structure in the polymer matrix, including a portion of the pad where the embedded structure is not present, and a window integral to the pad defined by the portion of the pad where the embedded structure is not present.

In another aspect, the present disclosure relates to a method. The method may include providing a mold having a first half and a second half and a recess defined in the first half, placing in the mold a fibrous structure to be embedded in a polymer matrix, placing in the mold a polymer matrix or a polymer matrix precursor for forming a polymer matrix, and closing the mold and applying heat and pressure to the polymer matrix or precursor for forming the polymer matrix. The method may also include solidifying the polymer matrix or the precursor for forming the polymer matrix and forming a pad, wherein the fibrous structure embedded in the polymer matrix includes a portion of the pad where the fibrous structure is not present, defining a window integral to the pad wherein said fibrous structure is not present.

In a further aspect, the present disclosure relates to a method of polishing a surface. The method may include providing a substrate for polishing having a surface, providing an aqueous slurry on at least a portion of the surface of the substrate, and providing a pad including a surface, wherein the pad comprises a polymer matrix capable of transmitting at least a portion of incident radiation. The pad may include at least one embedded structure in the polymer matrix, including a portion of the pad where the embedded structure is not present; and a window integral to the pad defined by the portion of the pad where the embedded structure is not present. In addition, the method may include polishing the surface of the substrate by the interaction of the substrate, the aqueous slurry and the pad.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

Figure 1:
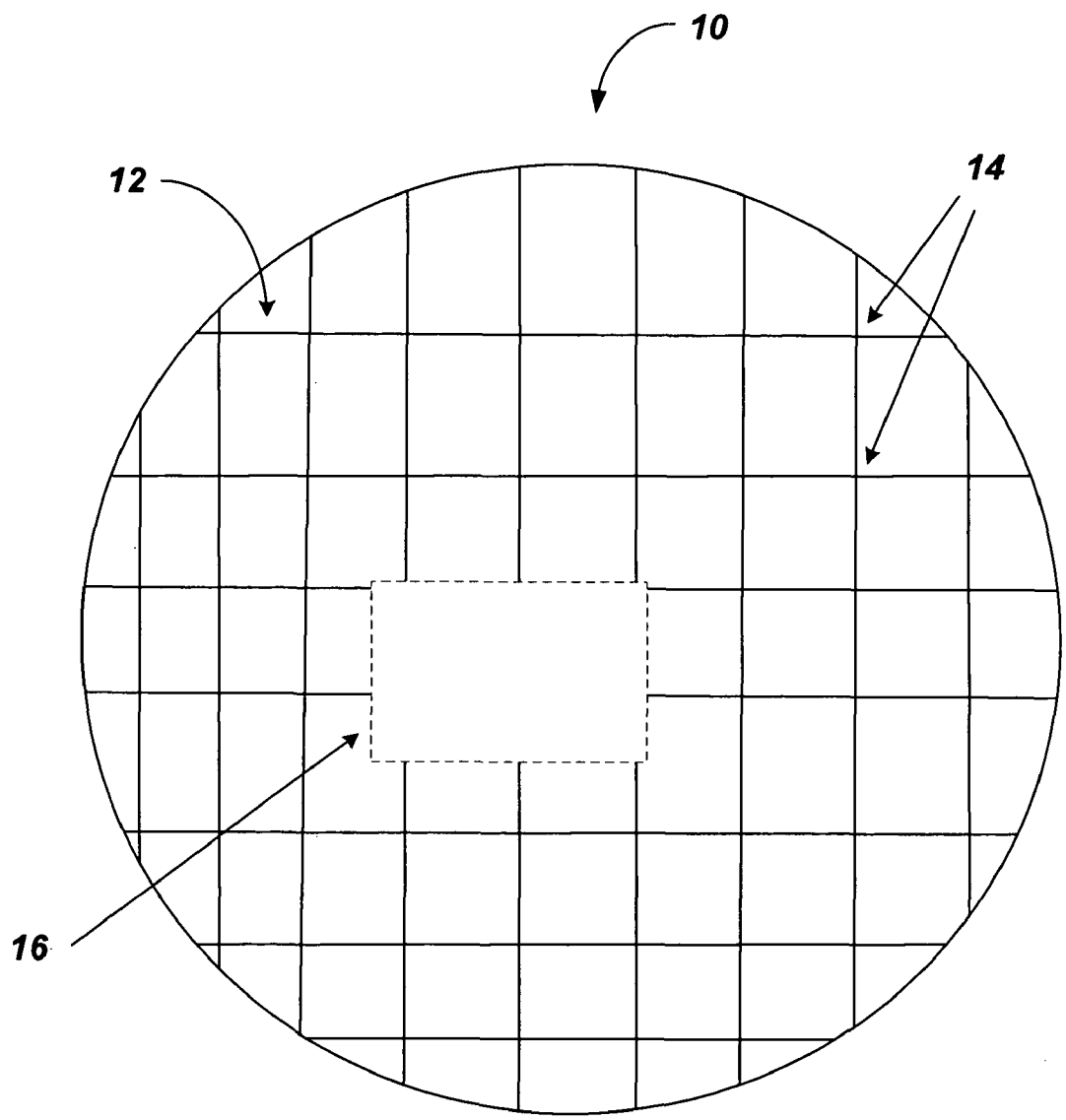
FIG. 1 illustrates an example of a polishing pad.

One example of a polishing pad herein is illustrated in FIG. 1. As shown, the pad 10 may include an embedded structure 12, discussed more fully below, which structure may define a plurality of intersection locations 14, dispersed in a pad polymer matrix. However, the structure may be provided such that it includes one or more window regions 16 where the embedded structure is not present.

The polymer matrix may be selected from a polymer resin that is capable of providing optical end point detection via use of a laser or some other light through the window 16 that is then reflected off of the polished surface of a substrate. Thus, the polymer matrix may be capable of transmitting at least a portion of incident radiation, including optical radiation. Incident radiation may be understood as radiation, such as light, which impinges on the surface of the polymer matrix. At least 1% or more of the radiation may be transmitted through a portion of the polymer matrix, such as through the thickness of the pad, including all values and increments in the range of 1% to 99%.

Figure 2:
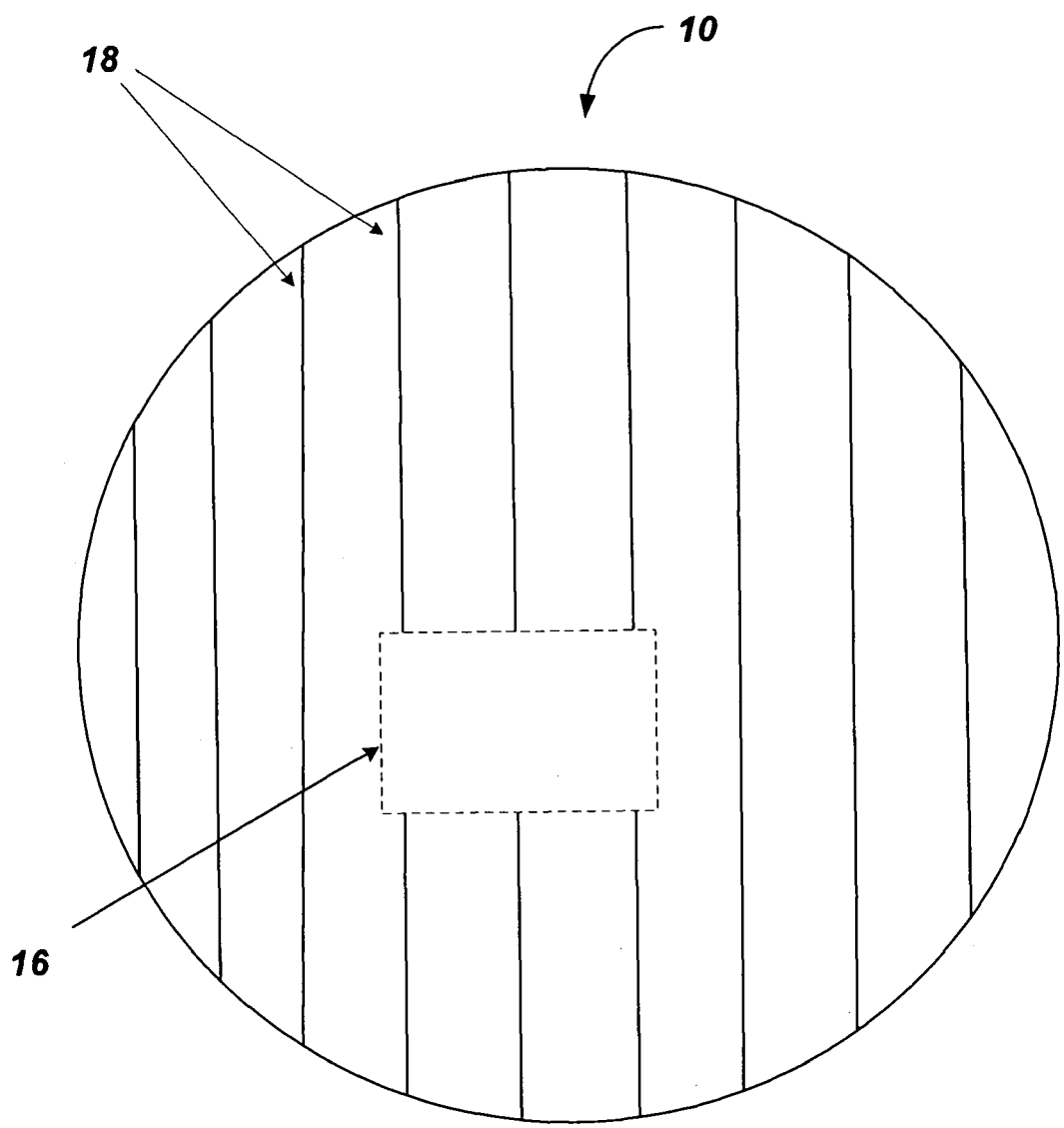
FIG. 2 illustrates an embedded structure included in a polishing pad.

The window 16 may assume any desired geometry, such as round, oval, square, rectangular, polyhedral, etc. In addition, as illustrated in FIG. 2, the embedded structure may also amount to a non-interconnecting type pattern 18 which again includes a window region 16. The embedded structure may also amount to a random type pattern.

The embedded structure itself may be composed of fibers, more specifically in the form of a nonwoven, woven, and/or knitted fabric type configuration. Such network of fibers may enhance certain features of the pad. Such features may include, e.g., pad surface hardness and/or bulk modulus and/or rigidity. In addition, the fiber network may be configured so that it enhances such features differently, as may be desired for a given polishing pad product. Therefore, the pads herein may be configured as desired to provide better global uniformity and local planarity of the polished semiconductor wafer, as well as window end-point detection capability. Expanding upon the above, other available materials for embedded structure may include open-cell polymeric foams and sponges, polymeric filters (e.g. filter paper and fibrous filters) grids and screens. The embedded structure may therefore have a defined two dimensional or three-dimensional pattern. The embedded structure therefore may be understood as any material dispersed in the pad with a selective region where the structure is not present, which region defines a window location for end point detection of a given polishing operation.

As may now be appreciated, by incorporating an embedded structure into the polymer matrix that is used to form the pad, such that a window is provided that may be considered integral to the pad structure (i.e. the pad being of unitary construction), one may avoid some of the problems associated with separately installing a window into the pad after it has been formed. For example, when manufacturing a pad to include a window, one may typically cut an opening in the pad and install a transparent section of material. However, this may then lead to leakage of the slurry due to improper installation around the edges of the window insert.

The polymeric substances, as well as the embedded structure, may be sourced from, but not be limited to, a variety of specific polymeric resins. For example, the polymeric resins may include polyvinylalcohol, polyacrylate, polyacrylic acids, hydroxyethylcellulose, hydroxylmethylcellulose, methylcellulose, carboxymethylcellulose, polyethylene glycol, starch, maleic acid copolymer, polysaccharide, pectin, alginate, polyurethane, polyethylene oxide, polycarbonate, polyester, polyamide, polypropylene, polyacrylamide, polyamide, as well as any copolymers and derivatives of the above resins.

The pads herein may optionally be grooved on at least one surface. Such grooving may be applied to the window based pads noted above, and or even to pads that do not include such a window configuration. Accordingly, the pads may include a variety of groove patterns, such as concentric, spiral, log positive and negative (counterclockwise and clockwise) and or combinations thereof. The groove dimensions may include a depth of 0.10 microns and above, a width of 0.10 microns and above, and a pitch (distance from center to center of adjacent grooves) of 0.10 microns and above. For example, the pads herein may contain groove depths of 50 to 5000 microns, widths of 50 to 5000 microns and a pitch of 50 to 2600 microns. For all of these values, it should be understood that the present disclosure include all values and increments within the particular range recited.

Figure 3:
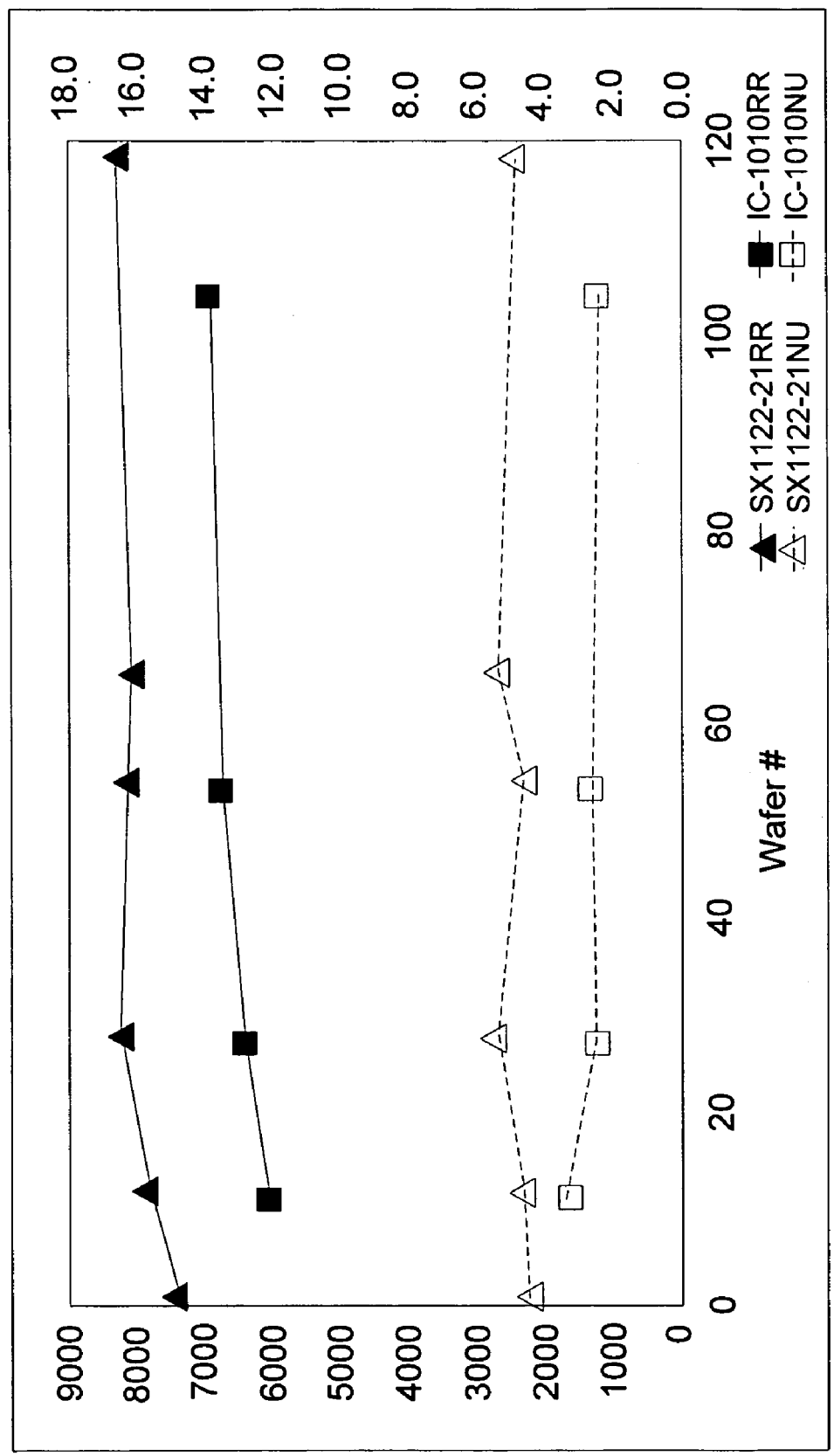
FIG. 3 illustrates the removal rate (RR) in Angstroms/minute for the RR of SX1122-21.

In particular, the pitch of the grooves herein may have a value of 1500 microns to 2250 microns (59 mils to 89 mils), including all values and increments therein. In such regard, reference is made to FIG. 3, which illustrates the removal rate (RR) in Angstroms/minute for the RR of SX1122-21, having a groove width of 508 microns, a groove depth of 762 microns, and a pitch of 2159 microns. As can be seen, such pad characteristics provided a relatively higher removal rate as compared to the RR of IC-1010, which has a groove width of 508 microns, a groove depth of 762 microns, and a pitch of 2286 microns. In addition, it may be noted that SX1122-21 maintained a non-uniformity (NU) of less than 6.0%, which is considered acceptable for pad polishing. Reference to the parameter NU is reference to a variation in thickness of the polished wafer.

Figure 4:
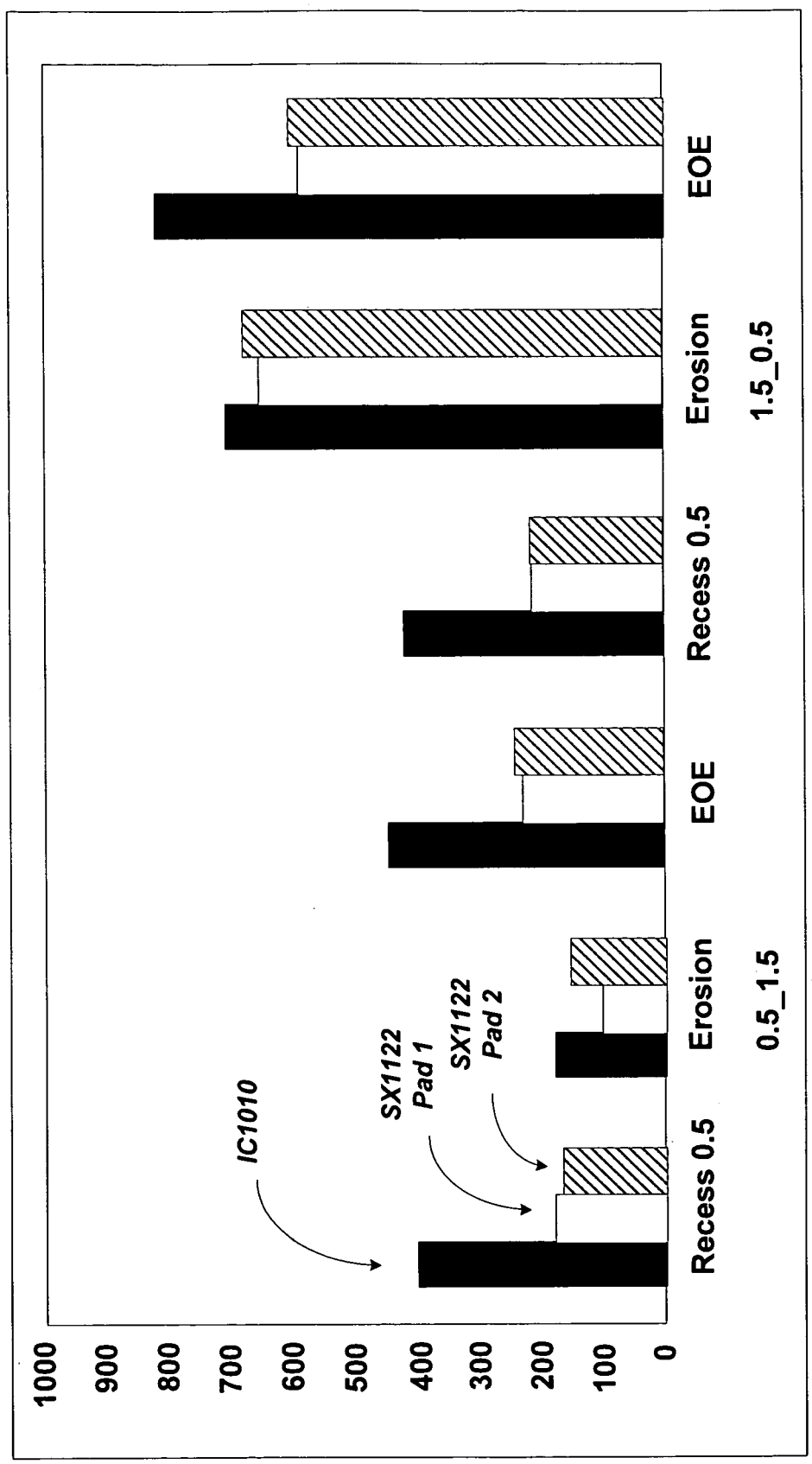
FIG. 4 illustrates comparative data regarding the SX112 pas versus IC-1010.

Attention is next directed to FIG. 4 which provides further comparative data regarding the SX1122 pad, noted above (two pad samples) versus IC-1010 available from Rohm & Haas. The parameters evaluated were "Recess 0.5" which is reference to the distance between the top of the insulating region on the pad to the adjoining 0.5 micron conductive trace. As can be seen, IC1010 indicated this vertical measurement to be 400 Angstroms, whereas the SX1122 indicated a vertical measurement of between 150-200 Angstroms. The parameter of "Erosion" is also shown, which may be understood as the undesirable excess removal of the insulation layer. As can be seen, IC1010 had a vertical measurement of about 175 Angstroms, whereas the SX1122 indicated vertical measurements of about 100 Angstroms (pad 1) or about 150 Angstroms (pad 2). The parameter of EOE or "Edge on Erosion" indicates a horizontal measurement reflecting a non-effective polishing area located on the perimeter of a given pad. As can be seen, IC1010 had an EOE of about 425 Angstroms, whereas the SX122 indicated values of about 200-225 Angstroms.

Figure 5:
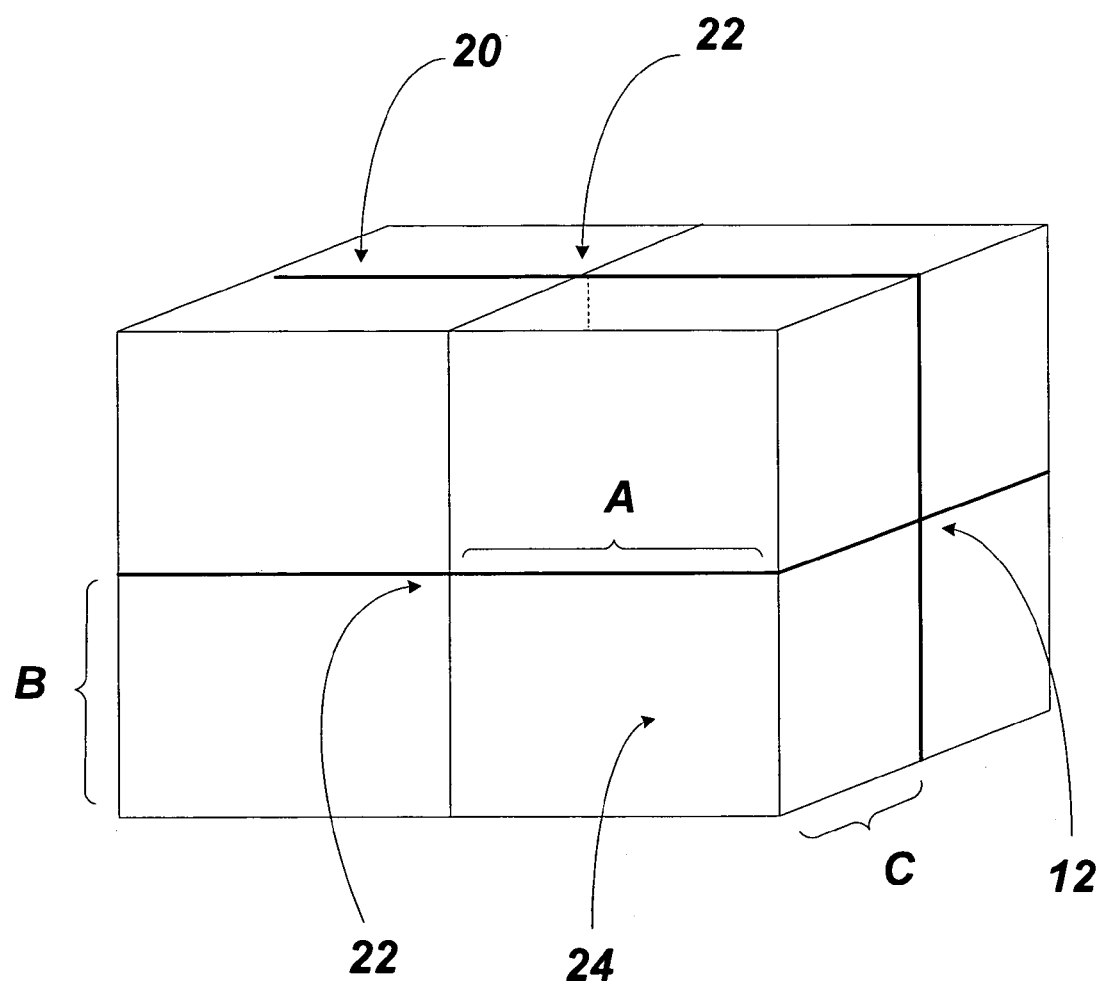
FIG. 5 illustrates an example of an embedded structure portion of a pad incorporating a three dimensional structure with a given pad.

As alluded to above, the embedded structure portion of the pad herein may be understood as incorporating a three-dimensional structure with a given pad, one example of which is shown in FIG. 5. As can be seen, it may include interconnecting polymer elements 20 along with a plurality of junction locations 22. Within the three-dimensional structure (i.e. the interstices) may be a particular polymeric binder material 24 (i.e., the polymer matrix) which, when combined with the three-dimensional interconnecting polymer elements 20, provide the polishing pad substrate. In addition, although the network is shown with a relative square or rectangular geometry, it may be appreciated that it may include other types of structures, including, but not limited to oval, round, polyhedral, etc.

In addition, a further aspect of this invention is the use of multiple three-dimensional embedded structural networks along with an integrally formed window which network may affect different physical and chemical property domains within the same pad. Accordingly, one may vary the chemical (polymeric) composition noted above for the embedded structural elements 20 and/or physical features of such elements. Such physical features may include the spacing of the elements 20, and or the overall shape of the embedded structural elements, as explained more fully below.

It is worth noting that advanced semiconductor technology requires packing a large number of smaller devices on the semiconductor wafer. Greater device density in turn requires greater degrees of local planarity and global uniformity over the wafer for depth of focus reasons in photo lithography. The three-dimensional structural network and window configuration in the present invention may therefore enhance the mechanical and dimensional stability of the CMP pad over conventional, non-network based CMP pad structures. The three-dimensional embedded structure herein with an integrally formed window may also better withstand the compressive and viscous shear stress of the polishing action, resulting in the desired degree of local planarity and global uniformity as well as low wafer scratching defects, as the surface deformation of the pad is reduced.

As alluded to above, the actual three-dimensional embedded structure within the pad can also be customized for a particular CMP application by varying the type of polymeric materials, the dimensions of the interconnecting and embedded elements, and the size and shape of the elements. In addition, various chemical agents including, but not limited to, surfactants, stabilizers, inhibitors, pH buffers, anti-coagulants, chelating agents, accelerators and dispersants may be added to the surface or bulk of the pad, so that they can be released in a controlled or uncontrolled manner into an abrasive slurry or polishing fluid to enhance CMP performance and stability.

One exemplary embodiment of the present invention comprises a polyurethane substance dispersed and partially or completely filling the interstices of a three-dimensional network made up of water-soluble (e.g. polyacrylate) embedded and interconnecting and embedded structural elements. The interconnecting elements within the pad and dispersed in the polyurethane may have a cylindrical shape with diameters from below 1 micron (e.g. 0.1 microns) to about 1000 microns, and what may be described as a horizontal length between adjacent interconnecting junctures ranging from 0.1 microns and higher (e.g. junctures with a horizontal length therebetween ranging from 0.1 microns to 20 cm, including all values and increments therein). This length between interconnecting junctures is show as item "A" in FIG. 5. In addition, what may be described as the vertical distance between interconnecting junctures is shown as item "B" in FIG. 5, and this may also vary as desired from 0.1 microns and higher (e.g., junctures having a vertical length therebetween ranging from 0.1 microns to 20 cm, including all values and increments therein). Finally, in what may described as a depth distance between junctures is shown as item "C" in FIG. 5, and again, this may also vary as desired from 0.1 microns and higher (e.g. junctures having a depth distance therebetween ranging from 0.1 microns to 20 cm, including all values and increments therein).

The three-dimensional embedded structure itself may be in the form of a thin square or circular slab with thickness in the range of 10 to 6000 mils and preferably between 60 to 130 mils, and an area between 20 to 4000 square inches and preferably between 100 to 1600 square inches, including all values and increments therein. A urethane pre-polymer mixed with a curing agent may be used to fill the interstices of the embedded structure, and the composite is then cured in an oven to complete the curing reaction of the urethane pre-polymer. Typical curing temperature ranges from room temperature to 800 deg F., and typical curing time ranges from as little as under an hour to over 24 hours. The resulting composite is then converted into a CMP pad using conventional pad converting processes such as buffing, skiving, laminating, grooving and perforating.

The embedded structure may also be available in the form of a cylinder or rectangular block in the above mentioned embodiment. It follows, then, that the composite comprising the embedded structure herein filled with urethane pre-polymer mixed with curing agent may also be cured in the form of a cylinder or rectangular block. In this case, the cured composite cylinder or block may first be skived to yield individual pads before converting.

Another embodiment of the present invention comprises two or more embedded structures having different thicknesses, the embedded structures further differentiated from each other by the types of polymeric material contained therein. For example, one portion of the pad included a first embedded structure may have a thickness of 1-20 centimeters and a second portion of the pad including a second embedded structure may have a thickness of 1-20 cm, each including all values and increments therein. The embedded structures within the same CMP pad then may define different pad domains having different physical and chemical properties, due to a selected difference in the chemical or physical properties of the embedded structures. For example, the first embedded structure may be selected from a first polymer and the second embedded structure may be selected from a second polymer, where the polymers differ in chemical repeating unit structure. A difference in chemical repeating unit composition may be understood as a difference in at least one element of the repeating unit, as between the two polymers selected, or a difference in the number of elements in the repeating units. For example, the first and second polymer may be selected from polymers such as polyesters, nylons, cellulosics, polyolefins, polyacrylates, modified acrylic fibers such as polyacrylonitrile based fibers, polyurethanes, etc.

One example would include a CMP pad having a first 20 mils thick region comprising embedded structure of soluble polyacrylate fibers in relatively small cylindrical form 10 microns diameter and 50 to 150 microns apart from each other that is stacked onto a second embedded structure comprising polyester fibers in the same cylindrical form and having the same dimensions as for the said first polyacrylate network of fibers. A urethane pre-polymer mixed with a curing agent may then be used to fill the interstices of the stacked fiber networks, and the entire composite is cured as mentioned above. The resulting composite is then converted into a CMP pad using conventional pad converting processes such as buffing, skiving, laminating, grooving and perforating. The CMP pad made in this manner has therefore two distinctly different but attached structural layers stacked on one another. In CMP, the layer comprising the soluble polyacrylate fibrous elements may be used as the polishing layer. The soluble polyacrylate elements may dissolve in the aqueous slurry containing the abrasive particles, leaving void spaces on and under the surface of the pad creating micron sized channels and tunnels for even distribution of the slurry throughout the pad. The layer containing the relatively insoluble polyester elements, on the other hand, may be employed as the supporting layer to maintain mechanical stability and bulk pad properties in CMP.

The aforementioned embodiments notwithstanding, it is recognized herein that one who is skilled in the art of CMP pad design, manufacture and application can readily appreciate the unexpected properties by the incorporation of the structural network into a CMP pad, and can readily derive, based on the present invention, a multitude of pad designs using the same concept with various types of network materials, structure, and polymeric substances in the same pad to meet the requirements of particular CMP applications.

What is claimed is:

1. A chemical mechanical polishing pad, comprising:
a pad including a surface, comprising a polymer matrix capable of transmitting at least a portion of incident radiation;
at least one embedded structure in said polymer matrix, including a portion of said pad where said embedded structure is not present; and
a window integral to said pad defined by said portion of said pad where said embedded structure is not present, wherein said embedded structure comprises elongated fibers having a diameter of 0.1 microns to 1000 microns and wherein said elongated fibers contain interconnecting junctures where said interconnecting junctures are spaced between 0.1 microns and 20 cm.

2. The polishing pad of claim 1 wherein said interconnecting junctures are spaced in a length direction, a horizontal direction, or a vertical direction.

3. The polishing pad of claim 1 wherein said at least one embedded structure comprises a first polymer, and said pad further includes a second embedded structure comprising a second polymer, wherein said first polymer and second polymer comprise different chemical repeating unit composition.

4. The polishing pad of claim 1, further comprising at least one groove defined in said surface.

5. The polishing pad of claim 4, wherein said at least one groove has a depth of 0.1 micron and above, a width of 0.1 micron and above, and wherein more than one groove is present a pitch of 0.1 micron and above.

6. The polishing pad of claim 1, wherein said at least one embedded structure includes a soluble material.

7. A method comprising:
providing a mold having a first half and a second half and a recess defined in said first half;
placing in said mold a structure to be embedded in a polymer matrix;
placing in said mold a polymer matrix or a polymer matrix precursor for forming a polymer matrix;
closing said mold and applying heat and pressure to said polymer matrix or precursor for forming said polymer matrix;
solidifying said polymer matrix or said precursor for forming said polymer matrix and forming a pad;
wherein said fibrous structure embedded in said polymer matrix includes a portion of said pad where said fibrous structure is not present, defining a window integral to said pad wherein said fibrous structure is not present, wherein said embedded structure comprises elongated fibers having a diameter of 0.1 microns to 1000 microns and wherein said elongated fibers contain interconnecting junctures where said interconnecting junctures are spaced between 0.1 microns and 20 cm.

8. The method of claim 7, wherein said polymer matrix pre-cursor comprises a prepolymer and a curing agent.

9. The method of claim 7, wherein said method further comprises curing said pad.

10. The method of claim 7 wherein said interconnecting junctures are spaced in a length direction, a horizontal direction, or a vertical direction.

11. The method of claim 7 wherein said at least one embedded structure comprises a first polymer, and said pad further includes a second embedded structure comprising a second polymer, wherein said first polymer and second polymer comprise different chemical repeating unit composition.

12. The method of claim 7, further comprising at least one groove defined in said surface.

13. The method of claim 12, wherein said at least one groove has a depth of 0.1 micron and above, a width of 0.1 micron and above, and wherein more than one groove is present a pitch of 0.1 micron and above.

14. The method of claim 7, wherein said at least one embedded structure includes a soluble material.

15. A method of polishing a surface, comprising:
providing a substrate for polishing having a surface;
providing an aqueous slurry on at least a portion of said surface of said substrate;
providing a pad including a surface, comprising a polymer matrix capable of transmitting at least a portion of incident radiation, said pad including at least one embedded structure in said polymer matrix, including a portion of said pad where said embedded structure is not present;
and a window integral to said pad defined by said portion of said pad where said embedded structure is not present; and
polishing said surface by the interaction of said substrate, said aqueous slurry and said pad, wherein said embedded structure comprises elongated fibers having a diameter of 0.1 microns to 1000 microns and wherein said elongated fibers contain interconnecting junctures where said interconnecting junctures are spaced between 0.1 microns and 20 cm.

16. The method of claim 15, further comprising providing radiation from an emitter and detecting at least a portion of said radiation reflected by said substrate by a sensor.

17. The method of claim 16, wherein said detected radiation indicates a polishing end point.

* * * * *